United States Patent [19]

Woodcock

[11] Patent Number: 5,237,595
[45] Date of Patent: * Aug. 17, 1993

[54] GUIDE PLATE FOR GUIDE TUBES USED IN NUCLEAR REACTORS

[75] Inventor: Joel Woodcock, Sewickly Township, Westmoreland County, Pa.

[73] Assignee: Westinghouse Electric Corp., Pittsburgh, Pa.

[*] Notice: The portion of the term of this patent subsequent to Oct. 1, 2008 has been disclaimed.

[21] Appl. No.: 484,320

[22] Filed: Feb. 26, 1990

[51] Int. Cl.$^5$ ............................................. G21C 1/04
[52] U.S. Cl. .................................. 376/353; 376/210; 376/352; 376/243
[58] Field of Search ............... 376/353, 207, 210, 243, 376/327, 352, 463

[56] References Cited

U.S. PATENT DOCUMENTS

| | | | |
|---|---|---|---|
| 3,305,449 | 2/1967 | Furgerson | 376/361 |
| 3,332,850 | 7/1967 | Jonsson et al. | 376/327 |
| 3,395,781 | 8/1968 | Trocki et al. | 376/327 |
| 3,712,852 | 1/1973 | Fisher | 376/327 |
| 4,092,216 | 5/1978 | Aubert | 376/399 |
| 4,231,843 | 11/1980 | Myron et al. | 376/352 |
| 4,265,708 | 5/1981 | Lawrence | 376/352 |
| 4,269,661 | 5/1981 | Kmonk et al. | 376/352 |
| 4,313,797 | 2/1982 | Attix | 376/353 |
| 4,584,168 | 4/1986 | Formanek | 376/353 |
| 4,597,935 | 7/1986 | Verdeau et al. | 376/399 |
| 4,624,826 | 11/1986 | Cearley et al. | 376/353 |
| 4,649,609 | 3/1987 | Allison et al. | 29/26 |
| 4,997,621 | 3/1991 | Johansson et al. | 376/444 |
| 5,006,305 | 4/1991 | Denizou | 376/353 |
| 5,053,189 | 10/1991 | Chrise et al. | 376/353 |

FOREIGN PATENT DOCUMENTS

| | | |
|---|---|---|
| 125325 | 11/1984 | European Pat. Off. . |
| 125326 | 11/1984 | European Pat. Off. . |
| 51-33299 | 5/1976 | Japan . |
| 51-94094 | 11/1976 | Japan . |
| 54-144588 | 8/1979 | Japan . |
| 54-10889 | 9/1979 | Japan . |
| 170834 | 1/1991 | Japan . |
| 1032396 | 11/1962 | United Kingdom . |
| 1128066 | 9/1968 | United Kingdom . |

*Primary Examiner*—Brooks H. Hunt
*Assistant Examiner*—Meena Chelliah

[57] ABSTRACT

An improved guide plate of the type used in the guide tubes of a nuclear reactor and having a central orifice for conducting coolant, and circular guide holes interconnected by slots for guidingly conducting the movement of control rodlets and control rod vanes through the guide tube is disclosed. The improvement comprises a plurality of vent openings in the form of vent holes uniformly disposed between the slots of the plate and vent gaps disposed between the outer periphery of the guide plate and the inner wall of the guide tube for reducing turbulence in the flow of coolant through the central orifice, thereby advantageously reducing both fretting and frictional engagement between the control rodlets and the guide holes. The resulting turbulence reduction further advantageously reduces the rodlet drop time through the guide tube, thereby enhancing reactor safety. Additionally, the guide holes of the improved guide plate are chrome plated to further reduce frictional engagement between the control rodlets and the plate.

25 Claims, 5 Drawing Sheets

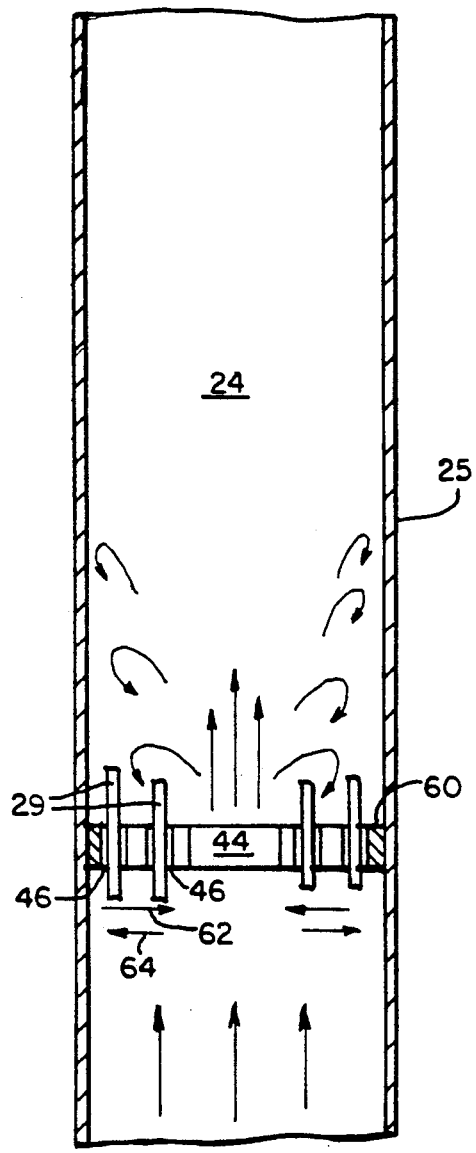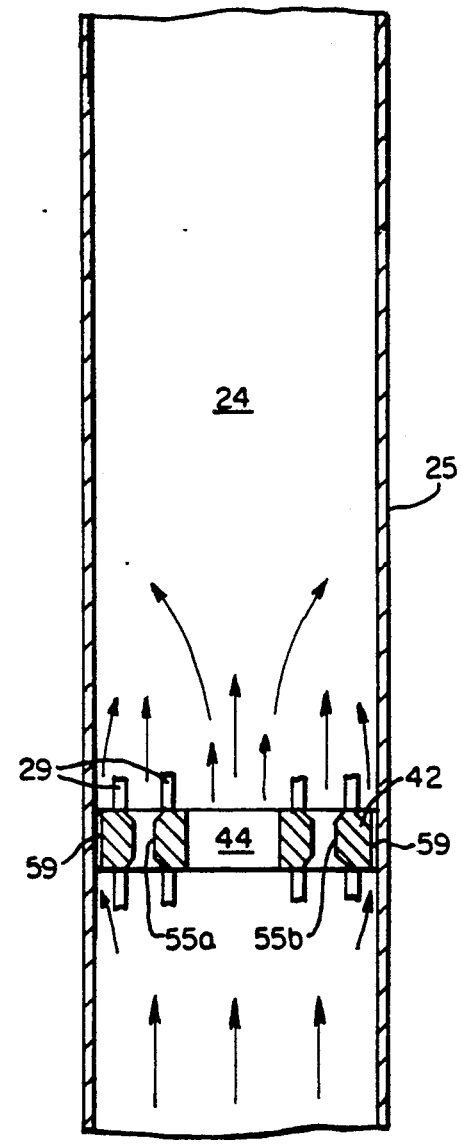
PRIOR ART
FIG. 7.
FIG. 8.

GUIDE PLATE FOR GUIDE TUBES USED IN NUCLEAR REACTORS

BACKGROUND OF THE INVENTION

This invention generally relates to an improved guide plate of the type used to guide the control rodlets through the guide tubes of a nuclear reactor. The guide plate includes a plurality of vent openings for reducing turbulence in the flow of coolant through the guide plate, which in turn reduces both fretting and frictional engagement between the control rodlets and the guide holes in such guide plates.

The core of a modern nuclear reactor of the type used to generate electrical power generally includes an upper internals assembly disposed over a lower core barrel. The lower core barrel houses an array of fuel assemblies which generate heat as a result of a controlled fission reaction that occurs in the uranium oxide pellets present within the individual fuel rods. Water is constantly circulated from the lower core barrel through the upper internals and out through the outlet ports provided in the walls of an upper core barrel in order to transfer the heat generated by the fuel rod assemblies to heat exchangers which ultimately convert this heat into usable, non-radioactive steam. The upper internals assembly includes an upper core barrel arrangement in tandem with the lower core barrel of the reactor. The ceiling of the upper core barrel is formed from an upper support plate. The peripheral edge of this support plate is seated around the upper edge of the upper core barrel. Both the support plate and the upper core plate which underlies it include a plurality of apertures for conducting the stream of hot, pressurized water exiting the fuel assemblies to the heat exchangers, as well as for conducting what are known in the art as rod cluster control assemblies into the fuel assemblies. The rate of the fission reaction taking place within the fuel assemblies is regulated by means of the rod cluster control assembly. Each of the control rod assemblies is formed of a neutron absorbing substance, such as an alloy of silver, indium and cadmium, that is clad in a tube of stainless steel. The stainless steel tubes (known as "rodlets" in the art) are suspended from a spider-like bracket formed from a plurality of interconnected vanes which in turn interconnect the top end of all of the rodlets. A reciprocable drive rod is connected to the spider-like bracket for either inserting or withdrawing the rodlets either deeper into or farther out of each of the fuel assemblies in order to modulate the amount of heat generated within the fuel assemblies.

As they reciprocate, the rodlets of the rod cluster control assemblies are guided into their respective fuel assemblies by guide tubes. The bottom end of each of these guide tubes is bolted onto the upper core plate which forms the ceiling of the lower core barrel, while the upper portion of each of these guide tubes is laterally supported within an aperture in the upper support plate which forms the ceiling of the upper core barrel of the reactor. While the lower end of each of the guide tubes includes a plurality of guide sheaths having round holes interconnected by slots which guide the rodlets in much the same fashion as a sword is guided into proper alignment within its sheath, the intermediate and upper portion of each guide tube includes a plurality of guide plates for this purpose. Similar to the guide sheaths, each of these guide plates includes a plurality of guide holes interconnected by slots for slidably receiving both the rodlets and the control rod vanes of the rod cluster control assembly. Each of the guide plates further includes a central orifice for conducting coolant through the guide tube. However, while the guide sheath may be 30 to 35 inches (76.2–88.9 cm) long, each of the guide plates is only about one inch (2.54 cm) thick. Hence, the guide plate provides guidance to the rodlets of the rod cluster control assembly with far less frictional engagement than the guide sheath provided at the very ends of each of the guide tubes, which is advantageous in view of the fact that such lowered frictional contact reduces the minimum drop time required to completely insert the rodlet into the fuel assemblies. Such a lowered drop time in turn allows the reactor operators to slow down or stop the nuclear reaction within the fuel assemblies in a shorter period of time in the event of an emergency situation.

While the performance of such prior art guide plates has generally proven to be satisfactory, the applicant has noted a number of areas in which the performance of these guide plates might be improved. For example, over a period of time, it has been observed that the flow of coolant water through the central orifice of these guide plates can induce vibrations in the rodlets which can cause them to rub against the guide holes in the plates and ultimately wear down the stainless steel cladding which forms the outer surface of such rodlets. Additionally, the applicant has observed that the flow of coolant through the central orifice in these guide plates also creates a low pressure area just above the upper surface of the plate which tends to radially pull each of the rodlets into frictional engagement with the guide holes that slidably receive them. Such frictional engagement, in combination with the periodic reciprocable movements of these rodlets during the operation of the reactor, can also cause the stainless steel cladding that forms the outer surface of the rodlets to wear down. The resulting fretting and wear caused by the flow patterns of coolant through such prior art guide plates reduces the life of the rodlets, thereby causing them to be replaced at shorter time intervals than would otherwise be the case. Such rodlet maintenance and replacement is expensive, since it increases reactor down time, and necessitates the opening up of the upper internals assembly of the reactor, which is in itself an expensive operation that exposes maintenance workers to potentially hazardous radiation.

Clearly, there is a need for an improved guide plate that eliminates or at least reduces unwanted fretting and frictional engagement between the rodlets of the rod cluster control assembly and the guide holes in the guide plate so as to minimize wear between these plates in the outer cladding of the rodlets. Ideally, the reduction in fretting and frictional engagement would result in an even faster minimum drop time for the rodlet to be inserted completely into the respective fuel assemblies, which in turn would enhance the safety capabilities of the reactor by allowing the reactor operators to more quickly reduce or stop the nuclear reaction within the fuel assembly in the event such reduction becomes necessary.

SUMMARY OF THE INVENTION

The invention is an improved guide plate of the type used in guide tubes of nuclear reactors which overcomes or at least ameliorates the problems associated with the prior art by the provision of at least one vent opening which reduces the turbulence in the coolant flow through the central orifice of the plate. The resulting reduction in turbulence results in less fretting and frictional engagement between the control rodlets and the guide holes in the guide plate.

The improved guide plate preferably includes a plurality of such vent openings, at least some of which may be in the form of vent holes provided between every two adjacent slots in the guide plate. Each of these vent holes may be chamfered at both ends to further reduce turbulence in the coolant which flows through the openings. Moreover, each of the vent openings is preferably located adjacent to the midpoint of each of the two slots that it is positioned between to uniformly relieve turbulence-causing pressure differentials between the stream of coolant flowing through the central orifice of the vent plate, and the coolant circulating around the periphery of this stream.

While the vent holes may assume a variety of shapes, circular holes are preferred due to their relative ease of manufacture. Additionally, the total cross sectional area of the vent holes is preferably between about 50 and 60 per cent of the cross sectional area of the central orifice, although the benefits of the invention may be realized with a greater or a lesser ratio of cross sectional area. Finally, to compensate for any mechanical weakening that the vent holes may have caused in the guide plate, the thickness of the guide plate is increased from 50 to 100 per cent over the of a prior art guide plate.

The vent openings may further assume the form of annular gaps between the peripheral edges of the guide plate and the inner wall of the guide tube. Such gaps may be between 0.125 and 0.375 inches (0.3175 and 0.9525 cm) wide, and the total combined area of these vent gaps may be 50 to 60 per cent of the area of the central orifice. Preferably, the vent openings include both vent holes and vent gaps so that the total additional fluid venting area is increased from 100 to 120 per cent.

The vent openings in the improved guide plate not only reduce fretting and frictional engagement between the rodlets of the rod cluster control assembly and the guide holes in the guide plate; they also advantageously reduce the minimum rod drop time through the guide tube by as much as 0.20 seconds, which allows the operator of the reactor to rapidly slow down the nuclear reaction within the fuel assemblies in the event of an emergency condition.

As a final improvement, the guide holes of the guide plate may be chrome plated. Such plating not only further reduces friction between the stainless steel cladding of the control rodlets and the guide holes; it also renders the surface of the guide holes more corrosion resistant, which helps to prevent binding between the rodlets and the holes during the lifetime of the reactor.

BRIEF DESCRIPTION OF THE SEVERAL FIGURES

FIG. 7 is a partially schematic, side cross-sectional view of a prior art guide plate, illustrating the turbulence generated by the flow of coolant through the central orifice thereof and how this turbulence induces fretting and frictional engagement between the rodlets and guide holes of the plate, and FIG. 8 is a partially schematic, cross-sectional side view of the improved guide plate of the invention, illustrating how the vent openings effectively eliminate the turbulence generated by the coolant flow through the central orifice thereof.

DETAILED DESCRIPTION OF THE PREFERRED EMBODIMENT

Figure 1:
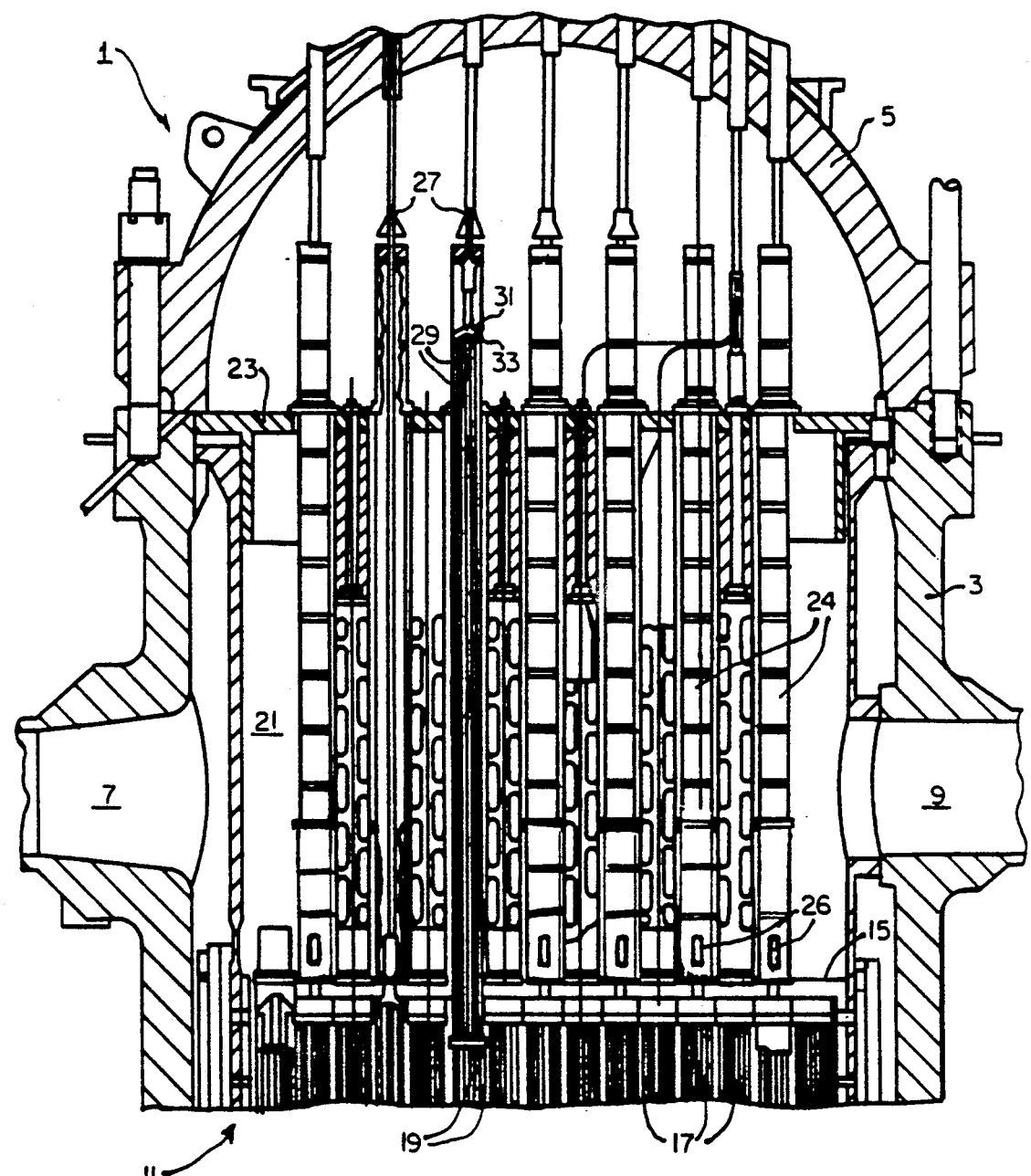
FIG. 1 is a cross sectional side view of the upper internals assembly of a nuclear reactor, illustrating the guide tubes disposed between the upper core plate and the upper support plate which guide the rodlets of the rod cluster control assembly into and out of the fuel assemblies disposed in the lower core barrel.
Figure 2:
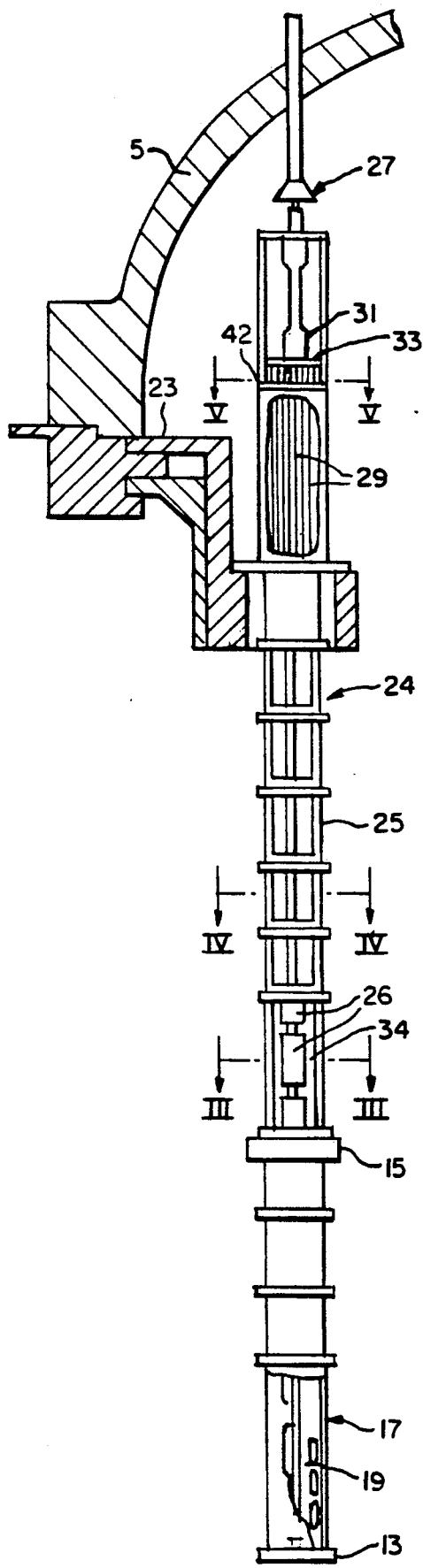
FIG. 2 is an enlarged, cross-sectional side view of the upper internals assembly illustrated in FIG. 1, showing a partial cross-sectional side view of one of the guide tubes thereof.

With reference now to FIG. 1, wherein like numbers designated like components throughout all the several figures, the invention is an improved guide plate for use in the guide tubes used in a nuclear reactor 1.

Such reactors 1 include a pressure vessel 3 having a removal closure head 5 which affords access to the upper internals assembly 6 contained therein. The pressure vessel 3 of the reactor 1 includes an inlet nozzle 7 for supplying a coolant, which may be water, to the interior of the reactor 1, and an outlet nozzle 9 for expelling coolant that has been heated by the reactor. The coolant expelled from the outlet nozzle 9 is circulated through a nuclear steam generator (not shown) which includes a system of heat exchanger tubes for converting non-radioactive water into steam which is ultimately used to drive electric generators. The bottom portion of the pressure vessel 3 includes a lower core barrel 11 defined between a foraminous lower core plate (not shown), and an apertured upper core plate 15. An array of nuclear fuel assemblies 17 is disposed between the lower and upper core plates 15. Each of these fuel assemblies 17 includes over 100 nuclear fuel rods 19, each of which is filled with fissionable uranium in the form of uranium dioxide The top portion of the pressure vessel 3 includes an upper core barrel 21 which is defined between the aforementioned upper core plate 15, and an upper support plate 23.

A number of guide tubes 24 are bolted between the upper core plate 15 and upper support plate 23. These guide tubes 24 each have tubular walls 25 which may be either circular or square in cross-sectional shape which are provided with flow ports 26 at their bottom ends for facilitating a flow of coolant water from the inside to the outside of these tubes 24. The purpose of the guide tubes 24 is to slidingly guide a cluster of control rodlets 29 into and out of the fuel assemblies 17 in order to modulate the nuclear reaction occurring in the uranium contained within the individual fuel rods 19. Each of these control rodlets 29 is part of a rod cluster control assembly 27. This control assembly 27 includes a spider bracket 31 which interconnects the top ends of all the rodlets 29 together by means of bracket vanes 33.

Figure 3:
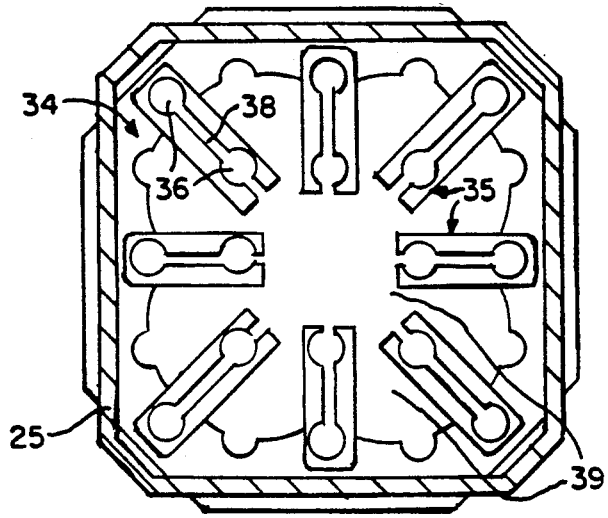
FIG. 3 is a cross-sectional plan view of the guide tube illustrated in FIG. 2 along the line 3—3, illustrating the guide sheath thereof.

The manner in which the guide tubes 24 guide the individual control rodlets 29 of each rod cluster control assembly 27 is best understood with reference to FIGS. 2-5. At the bottom end of each of the guide tubes 24, where a precise alignment between the control rodlets 29 and various openings (not shown) in the fuel assembly 17 is the most critical, the guide tube 24 includes a guide sheath assembly 34 that is best seen in FIG. 3. In its interior, sheath assembly 34 includes a plurality of guide sheaths 35, each of which includes a pair of guide holes 36 interconnected by means of a slot 38. Each of the guide sheaths 35 is approximately 35 inches (88.9 cm) long, and operates to align the particular pair of rodlets 29 that it receives in much the same fashion that a sword aligns itself when inserted within its sheath, with the guide holes 36 each receiving an individual rodlet 29, and the slot 38 receiving the particular bracket vane 33 that inter-connects the rodlets 29. The guide sheath assembly 34 also includes a plurality of C-tubes 37 that slidably receive single rodlets on a single vane. The open spaces 39 between the guide sheaths 35 and C-tubes 37 conducts the axial flow of coolant flowing up from the fuel assemblies 17 below the upper core plate 15 to the middle and upper portions of the guide tube 24.

Figure 5:
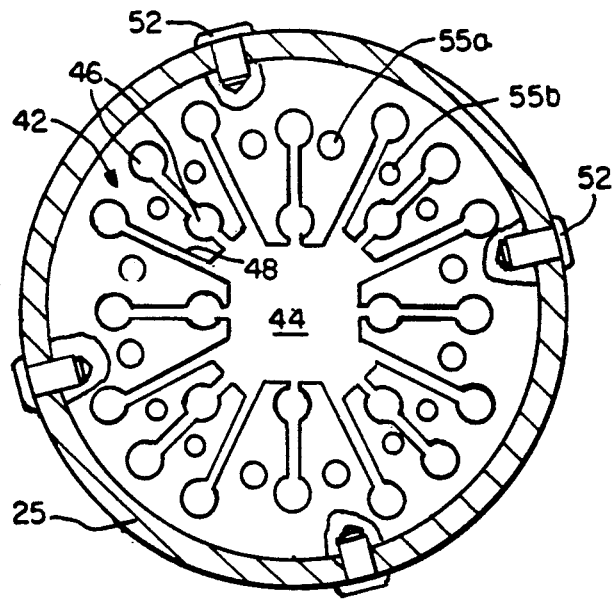
FIG. 5 is a plan, cross-sectional view of the guide tube illustrated in FIG. 2 along the line 5—5, illustrating one of the upper guide plates used in the upper portion thereof.
Figure 4:
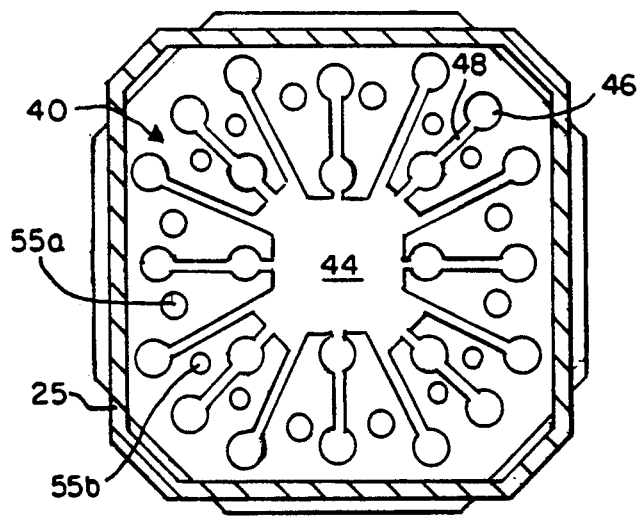
FIG. 4 is a plan, cross-sectional view of the guide tube illustrated in FIG. 2 along the line 4—4, illustrating one of the lower guide plates used in the middle portion thereof.

At the middle and upper portions of the guide tube 24, alignment of the rodlets 29 is achieved by means of the lower guide plates 40 and upper guide plates 42 illustrated in FIGS. 4 and 5. A typical guide tube 24 includes between six and eight lower guide plates 40, and about four to six upper guide plates 42. In both the middle and upper sections of the guide tube 24, the guide plates 40,42 are spaced a little over twelve inches (30.48 cm) apart. Unlike the previously described guide sheath assembly 34, the plurality of spaced apart guide plates 40 and 42 do not envelope each of the rodlets 29 within a continuous sheath-like structure all along the longitudinal axis of the guide tube 24. But, while the discontinuity of the guidance afforded by these plates 40 and 42 does not allow them to guide the rodlet 29 quite as accurately as continuous guide sheaths 35, the guidance afforded by these plates 40 and 42 is accompanied by far less friction than the guidance afforded by such guide sheaths 35. The reduction in such frictional engagement more than compensates for any small loss in alignment ability by lengthening the life expectancy of the outer cladding of these rodlets 29, and further by reducing the minimum amount of time required to completely insert the rodlets 29 into their respective fuel assemblies 17. This "drop time" minimization aspect is an important one, as it results in the ability of the system operator to reduce or stop the nuclear reaction occurring within the fuel rods 19 of the fuel assembly 17 in the event of an emergency condition.

Figure 6:
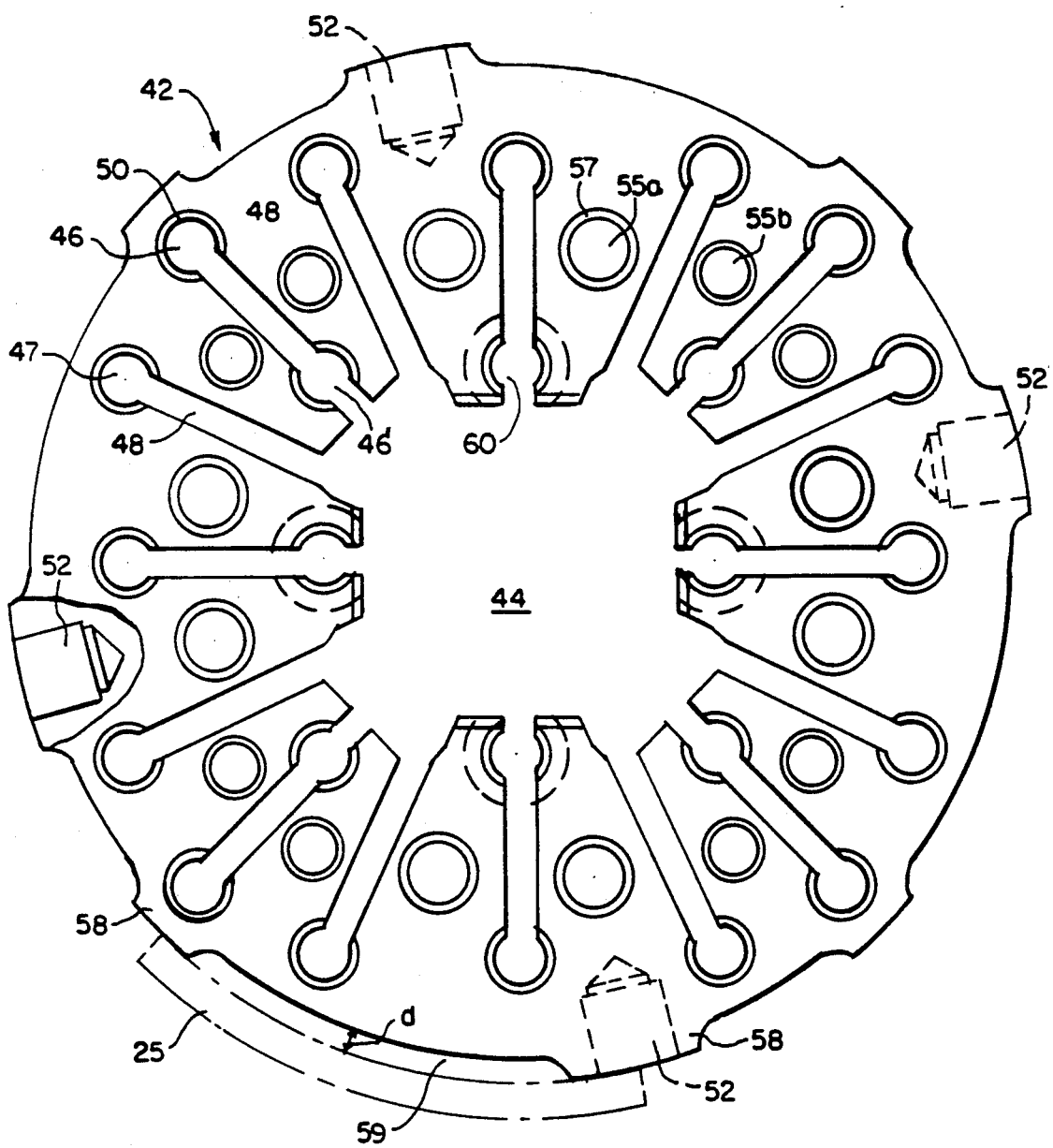
FIG. 6 is an enlarged view of the guide plate illustrated in FIG. 5 illustrating in detail both the vent holes and the vent gaps of the invention.

With reference now to FIGS. 4, 5 and 6, each of the guide plates 40,42 includes a central orifice 44 for conducting coolant throughout the longitudinal axis of the guide tube 24. Like the previously described guide sheaths 35 of the guide sheath assembly 34, each plate 40 and 42 includes a plurality of guide holes pairs 46 interconnected between themselves and with the central orifice 44 by means of a slot 48, as well as single guide holes 47 which are similarly interconnected with the orifice 44 by means of a slot 48. To facilitate the receipt of the rodlets 29 into the guide holes 46,47, the upper and lower ends of each of the guide holes 46,47 preferably includes a bevel 50 as shown. Finally, each of the guide plates 40 and 42 include radial bores 52 for receiving pins (not shown) which affix the plate to the walls 25 of its respective guide tube 24.

As may best be seen in FIG. 6, each of the guide plates 40,42 of the invention advantageously includes a plurality of vent openings in the form of vent holes 55a,b, and in the form of annular vent gaps 59 which, as will be explained in detail hereinafter, greatly reduce fretting and unwanted frictional engagement between the guide holes 46,47 in the plates 40 and 42, and the control rodlets 29.

As is evident in FIG. 6, the vent holes 55a,b are each disposed between the slots 48 that interconnect the guide holes 46,47 with the central orifice 44. While more than one of such vent holes 55a,b could be provided between the various slots 48, only one such vent hole is preferred in order to simplify manufacturing. Each vent hole 55a,b that is positioned between any two adjacent slots 48 in the plate is preferably positioned adjacent to the midpoints of these slots 48, which is most effective position for these holes 55a,b to eliminate turbulence. Additionally, the diameter of these holes 55a,b is made as large as possible without jeopardizing the structural integrity of the plate 42. Because the lateral distance between adjacent slots 48 in the plate 42 varies, some of the vent holes 55a have a larger diameter than other of the vent holes 55b. To further assist each of these openings 55a,b in achieving their turbulence-minimizing function, both ends of each opening 55a,b is preferably chamfered in the manner illustrated in FIG. 6.

In addition to vent holes 55a,b, each of the guide plates 40,42 of the invention also includes vent openings in the form of annular vent gaps 59. These gaps 59 are created by the provision of flanges 58 which, in the preferred embodiment, have a radial length of approximately 0.25 inches (0.635 cm) as measured from the center of the orifice 44. Four of these flanges 58 envelope the radial bores 52 into which the mounting pins are inserted that mount the plates 40,42 to the walls 25 of the guide tubes 24, while the other four flanges 58 are disposed between the first four flanges 58. While the vent gaps 59 in the preferred embodiment have a radial length (relative to the center of the orifice 44) of 0.25 inches (0.635 cm), gaps of as little as 0.125 inches (0.3175 cm) or smaller are within the purview of the invention. Additionally, while the radial length of the gaps 59 is shown to be substantially constant in the preferred embodiment, this radius may vary the only constraint being that the total cross-sectional area of any such vent gap 59 must be large enough to allow a flow around the edge of the plate 40 and 42 that is sufficient to significantly reduce the turbulence and pressure differential created just above the plate 40,42 by the flow of coolant through the orifice 44.

To compensate for the reduction in shear strength caused by the provision of such vent openings in the plates 40,42, the thickness of these plates 40,42 is increased between 50 and 100 per cent. Accordingly, while the typical thickness of a prior art guide plate might be on the order of one inch (2.54 cm), the thickness of a guide plate 40,42 made in conformance with the invention is preferably between about 1.5 to 2.0 inches (3.81 to 5.08 cm).

Finally, to further reduce frictional contact between the stainless steel or other metallic cladding that forms the outer surface of the rodlets 29, and the surface of the guide holes 46,47 in the guide plates 40,42, each of the guide holes 47,48 is preferably lined with a chrome plating 51. Such a chrome plating 51 not only renders the surfaces of these guide holes 46,47 smoother and harder; it further makes them even more corrosion resistant, which in turn helps keeps these inner surfaces smooth. This last feature is an important one, because even though the guide plates 40,42 are preferably fabricated from number 304 stainless steel, such stainless steel is not entirely corrosion proof in the relatively corrosive environment of a nuclear reactor hot, super heated water circulates over all metallic surfaces for periods of years.

FIGS. 7 and 8 illustrate how the vent holes 55a,b and annular vent gaps 59 of the invention reduce turbulence. FIG. 7 illustrates a prior art guide plate 60 mounted in the walls 25 of a guide tube 24. As has been previously indicated, coolant in the form of water flows through the fuel assemblies 17 and through apertures (not shown) in the upper core plate 15 and axially through the guide tubes 24. When this coolant flow (indicated by the flow arrows) impinges the underside of a prior art guide plate 60 whose guide holes 46 are obstructed by the rodlets 29 of rod cluster control assembly 27, the flow of coolant is constricted through the opening afforded by the central orifice 44. As a result, a turbulent flow of coolant is generated around the upper surface of the prior art guide plate 60 from the interaction between the relatively rapidly moving coolant through the orifice 44 and the relatively quiescent coolant situated around the upper periphery of the plate 60. While the pressure differential generated between the quiescent coolant and the rapidly moving coolant through the orifice 44 generates a net radial vector 62 which tends to pull the rodlets 29 into engagement against their respective guide holes 46, the chaotic nature of the turbulence also creates a relatively smaller radially oriented pressure (indicated by the vector 64) so that the net result is a lateral vibration of the rodlets 29 accompanied by fretting and enhanced frictional engagement of the rodlets 29 against the guide holes 46. Over a period of time, such fretting and frictional engagement can damage and wear down the walls of the stainless steel cladding that surrounds the rodlets 29. In the preferred embodiment, the total cross-sectional area of the vent holes 55a,b is between about 50 and 60 per cent of the cross-sectional area of the central orifice 44.

FIG. 8 illustrates how the vent openings in the improved guide plate 40,42 of the invention substantially prevents such turbulence from occurring. Specifically, these vent openings in the form of the vent holes 55a,b in combination with the annular vent gaps 59 allows the flow of coolant through the guide tube 24 to remain substantially parallel through the improved plate 40,42. The resulting, substantially parallel flow of coolant through the plate 40,42 eliminates much of the turbulence associated with a flow directed exclusively through the central orifice 44. Accordingly, the pressure differentials and lateral force vectors 62,64 associated with such turbulent flow are eliminated, and the rodlets 29 do not significantly fret against their respective guide holes 46, and moreover, do not frictionally engage against these holes as they are inserted into or withdrawn out of a fuel assembly 17. Finally, what small amount of frictional contact which may exist between these rodlets 29 and guide hole 46 can be even further minimized by the provision of the previously discussed chrome plating 51 in the guide holes 46,47 of the improved plates 40,42. In the preferred embodiment, the total cross-sectional area of all the vent gaps 59 is between 50 and 60 per cent of the orifice 44, so that the area of all of the vent openings 55a,b and 59 in the improved guide plate 40,42 of the invention is between 100 and 120 per cent of the central orifice 44.

While the invention has been described with respect to a preferred embodiment, many variations in both the form and the dimensioning of the vent openings will become apparent to the person of ordinary skill in the art. All such variation in shape and dimensions of the vent openings are considered to be within the purview of this invention, which is constrained only by the claims appended hereto.

I claim:

1. An improved guide plate of the type used in the guide tubes of a pressurized water type nuclear reactor and having a central orifice for conducting coolant, and guide holes interconnected by slots for guidingly conducting the movement of control rodlets and control rod vanes through its respective guide tube, wherein the improvement comprises at least one vent opening in said guide plate for reducing both fretting and frictional contact between the control rodlets and said guide holes by lowering the pressure differential and the amount of turbulent flow across the plate.

2. The improved guide plate defined in claim 1, wherein the improvement further comprises a plurality of said vent openings.

3. The improved guide plate defined in claim 2, wherein said plurality of vent openings are uniformly distributed around the periphery of the guide plate.

4. The improved guide plate defined in claim 3, wherein said vent openings are in the form of gaps between the outer edge of the guide plate and the inner surface of the guide tube that are at least 0.1250 inches wide.

5. The improved guide plate defined in claim 2, wherein the thickness of the guide plate is increased to compensate for any diminishment of shear strength caused by the provision of said vent openings through said plate.

6. The improved guide plate defined in elaim 2, wherein each of said vent openings includes a chamfer at both ends to reduce turbulence in the flow of coolant passing through said openings.

7. The improved guide plate defined in claim 2, wherein said vent openings are uniformly distributed between said slots interconnecting said circular guide holes.

8. The improved guide plate defined in claim 7, wherein only one vent opening is provided between every two adjacent slots.

9. The improved guide plate defined in claim 8, wherein each of said vent openings is located adjacent to the midpoint of each of the two adjacent slots it is positioned between.

10. The improved guide plate defined in claim 2, wherein the total cross sectional area of said vent openings is between about 80 and 120 per cent of the area of said central orifice.

11. An improved guide plate of the type used in the guide tubes of a pressurized water type nuclear reactor and having a central orifice for conducting coolant, and circular guide holes interconnected by slots for guidingly conducting the movement of control rodlets and control rod vanes through its respective guide tube, wherein the improvement comprises a plurality of vent openings in said guide plate for reducing both fretting and frictional contact between the control rodlets and the guide holes and for reducing the rodlet drop time through the guide tube by reducing turbulence in said coolant flow through said central orifice and by lowering the pressure differential across the plate.

12. An improved guide plate as defined in claim 11, wherein each of said vent openings includes a chamfer at both ends to reduce turbulence in the flow of coolant passing through said openings.

13. An improved guide plate as defined in claim 11, wherein said vent openings are uniformly distributed between said slots interconnecting said circular guide holes.

14. An improved guide plate as defined in claim 13, wherein only one vent opening is provided between every two adjacent slots.

15. An improved guide plate as defined in claim 14, wherein each of said vent openings is located adjacent to the midpoint of each of the two adjacent slots it is positioned between.

16. An improved guide plate as defined in claim 11, wherein the total cross sectional area of said vent openings is between about 80 and 120 per cent of the area of said central orifice.

17. An improved guide plate as defined in claim 11, wherein said vent openings are in the form of gaps between the outer edge of the guide plate and the inner surface of the guide tube that are at least 0.1250 inches wide.

18. An improved guide plate as defined in claim 11, wherein said plurality of vent openings are uniformly distributed around the periphery of the guide plate.

19. An improved guide plate as defined in claim 11, wherein said vent openings are in the form of gaps between the outer edge of the guide plate and the inner surface of the guide tube that are at least 0.1250 inches wide.

20. An improved guide plate as defined in claim 11, wherein the guide holes are chrome plated to further reduce frictional engagement between the control rodlets and the guide plate, and to render the surface of said holes corrosion proof.

21. An improved guide plate of the type used in the guide tubes of a pressurized water type nuclear reactor and having a central orifice for conducting coolant, and circular guide holes interconnected by slots for guidingly conducting the movement of control rodlets and control rod vanes through its respective guide tube, wherein the improvement comprises a plurality of chamfered vent openings uniformly disposed between said slots in said plate for reducing both fretting and frictional contact between the control rodlets and the guide holes and for reducing the rodlet drop time through the guide tube by reducing turbulence in said coolant flow through aid central orifice and by reducing the pressure differential across the plate.

22. An improved guide plate as defined in claim 21, further including vent gaps disposed between the outer edge of the guide plate and the inner surface of the guide tube.

23. An improved guide plate as defined in claim 22, wherein the combined cross-sectional area of the vent openings between said slots is between 50 and 60 per cent of the area of said central orifice, and wherein the cross-sectional area of said vent gaps is between 50 and 60 per cent of the area of said central orifice.

24. An improved guide plate as defined in claim 21, wherein the thickness of the guide plate is increased to compensate for any diminishment of shear strength caused by the provision of said vent openings through said plate.

25. An improved guide plate as defined in claim 21, wherein the guide holes are chrome plated to further reduce frictional engagement between the control rodlets and the guide plate, and to render the surface of said holes corrosion proof.

* * * * *